US011895200B2

(12) United States Patent
Bower, III et al.

(10) Patent No.: US 11,895,200 B2
(45) Date of Patent: Feb. 6, 2024

(54) ACCESS TO AN OPERATOR PANEL OVER AN OUT-OF-BAND LOCAL NETWORK DOMAIN

(71) Applicant: Lenovo Enterprise Solutions (Singapore) Pte. Ltd., Singapore (SG)

(72) Inventors: Fred A. Bower, III, Durham, NC (US); Caihong Zhang, Shanghai (CN); CheKim Chhuor, Shanghai (CN)

( * ) Notice: Subject to any disclaimer, the term of this patent is extended or adjusted under 35 U.S.C. 154(b) by 1695 days.

(21) Appl. No.: 15/468,438

(22) Filed: Mar. 24, 2017

(65) Prior Publication Data

US 2018/0278696 A1 Sep. 27, 2018

(51) Int. Cl.
| | | |
|---|---|---|
| *H04L 67/51* | (2022.01) | |
| *H04L 41/046* | (2022.01) | |
| *H04L 67/14* | (2022.01) | |
| *H04L 41/00* | (2022.01) | |
| *H04L 101/659* | (2022.01) | |
| *H04L 101/686* | (2022.01) | |

(52) U.S. Cl.
CPC ............ *H04L 67/51* (2022.05); *H04L 41/046* (2013.01); *H04L 41/24* (2013.01); *H04L 67/14* (2013.01); *H04L 2101/659* (2022.05); *H04L 2101/686* (2022.05)

(58) Field of Classification Search
CPC ..... H04L 67/16; H04L 67/14; H04L 61/6059; H04L 61/6086; H04L 41/046; H04L 41/24
USPC ......................................... 709/201–203, 217
See application file for complete search history.

(56) References Cited

U.S. PATENT DOCUMENTS

| | | | | |
|---|---|---|---|---|
| 6,909,702 | B2 * | 6/2005 | Leung | H04W 76/40 |
| | | | | 370/278 |
| 9,043,463 | B1 * | 5/2015 | Cohn | H04L 41/0816 |
| | | | | 709/225 |
| 10,181,985 | B1 * | 1/2019 | Passaglia | H04L 67/1061 |
| 10,277,698 | B1 * | 4/2019 | Gerard | H04L 65/756 |
| 11,223,690 | B2 * | 1/2022 | Dain | G06F 9/5061 |
| 2002/0116485 | A1 * | 8/2002 | Black | H04L 29/06 |
| | | | | 709/223 |
| 2004/0153701 | A1 * | 8/2004 | Pickell | H04L 1/22 |
| | | | | 714/4.4 |

(Continued)

FOREIGN PATENT DOCUMENTS

| | | | | |
|---|---|---|---|---|
| EP | 1771016 | A2 * | 4/2007 | ............ H04L 41/046 |
| WO | WO-2017007783 | A1 * | 1/2017 | .......... H04L 61/1511 |

*Primary Examiner* — Melvin H Pollack
(74) *Attorney, Agent, or Firm* — Jeffrey L. Streets

(57) ABSTRACT

An apparatus, such as a computing node, includes a storage device for storing program instructions and a service processor for processing the program instructions to: send an out-of-band request for access to an operator panel, wherein the out-of-band request is sent over a local network domain operatively coupling a plurality of computing nodes; receive a first out-of-band reply identifying an address and one or more capabilities of an operator panel accessible over the local network domain; and negotiate an active link to the operator panel over the local network domain. Another apparatus is similar but further includes an operator panel operatively coupled to a service processor, the service processor for processing the program instructions to: receive the out-of-band request over the local network domain; send the first out-of-band message; and negotiate an active link between the operator panel and a computing node.

19 Claims, 2 Drawing Sheets

(56) References Cited

U.S. PATENT DOCUMENTS

| | | | |
|---|---|---|---|
| 2005/0076107 A1* | 4/2005 | Goud | G06F 9/4405 709/223 |
| 2006/0184989 A1* | 8/2006 | Slothouber | H04N 7/17318 725/110 |
| 2007/0254636 A1* | 11/2007 | Jiang | H04M 3/42 455/414.1 |
| 2008/0098321 A1* | 4/2008 | Krithivas | H04L 41/344 715/740 |
| 2011/0282979 A1* | 11/2011 | Bower, III | H04L 29/12981 709/222 |
| 2012/0099566 A1* | 4/2012 | Laine | H04M 1/72412 370/338 |
| 2012/0198349 A1* | 8/2012 | Chandrasekhar | H04L 67/10 715/740 |
| 2013/0167037 A1* | 6/2013 | Xaio | G06F 9/5055 715/738 |
| 2013/0326089 A1* | 12/2013 | Harrison | H04W 24/06 710/5 |
| 2014/0006605 A1* | 1/2014 | Frei | H04L 12/2825 709/224 |
| 2014/0016628 A1* | 1/2014 | McCann | H04L 67/56 370/338 |
| 2014/0089478 A1* | 3/2014 | Seed | H04W 4/50 709/222 |
| 2014/0118123 A1* | 5/2014 | Lim | H04L 12/282 340/12.53 |
| 2014/0126708 A1* | 5/2014 | Sayko | H04M 11/00 379/93.01 |
| 2014/0229588 A1* | 8/2014 | Hjelm | H04L 12/281 709/220 |
| 2014/0304319 A1* | 10/2014 | Xiao | H04L 41/5058 709/203 |
| 2014/0372580 A1* | 12/2014 | Huster | H04L 41/0806 709/222 |
| 2015/0109956 A1* | 4/2015 | Chu | H04L 41/08 370/254 |
| 2015/0142968 A1* | 5/2015 | Bhagwat | H04L 67/51 709/224 |
| 2015/0163635 A1* | 6/2015 | Leppanen | H04W 8/005 455/426.1 |
| 2015/0195719 A1* | 7/2015 | Rahman | H04W 24/08 455/424 |
| 2015/0289405 A1* | 10/2015 | Stewart | G06F 13/409 211/26 |
| 2016/0036762 A1* | 2/2016 | Droms | H04L 41/12 709/224 |
| 2016/0127510 A1* | 5/2016 | Ding | H04L 67/02 709/203 |
| 2016/0212194 A1* | 7/2016 | Palin | H04W 4/80 |
| 2016/0269235 A1* | 9/2016 | Zimmermann | H05K 5/03 |
| 2016/0269492 A1* | 9/2016 | Gupta | G06F 16/16 |
| 2017/0085413 A1* | 3/2017 | Cencini | G06F 9/4416 |
| 2017/0085637 A1* | 3/2017 | Cencini | G06F 15/161 |
| 2017/0093640 A1* | 3/2017 | Subramanian | H04L 41/12 |
| 2017/0094377 A1* | 3/2017 | Herdrich | H04L 41/5009 |
| 2017/0116103 A1* | 4/2017 | Cencini | H04L 41/24 |
| 2017/0127344 A1* | 5/2017 | Liu | H04W 76/14 |
| 2017/0147681 A1* | 5/2017 | Tankersley | G06F 11/321 |
| 2017/0164416 A1* | 6/2017 | Yeddala | H04W 36/30 |
| 2017/0187573 A1* | 6/2017 | Haswell | H04L 43/08 |
| 2017/0237817 A1* | 8/2017 | Sharma | H04W 36/08 370/331 |
| 2017/0318023 A1* | 11/2017 | Seed | H04L 67/51 |
| 2017/0318098 A1* | 11/2017 | Sanghvi | H04W 84/18 |
| 2017/0359555 A1* | 12/2017 | Irani | G07C 9/00309 |
| 2017/0366983 A1* | 12/2017 | Gunasekara | H04L 43/0811 |
| 2017/0372600 A1* | 12/2017 | Palin | H04W 4/80 |
| 2018/0027080 A1* | 1/2018 | Yang | H04L 47/70 709/224 |
| 2018/0131574 A1* | 5/2018 | Jacobs | H04L 43/0817 |
| 2018/0131579 A1* | 5/2018 | Jacobs | H04L 41/022 |
| 2018/0183882 A1* | 6/2018 | Flynn | H04L 69/321 |
| 2018/0219976 A1* | 8/2018 | Decenzo | H04L 67/01 |
| 2018/0302290 A1* | 10/2018 | Rahman | H04W 4/70 |
| 2019/0199815 A1* | 6/2019 | Park | H04W 8/005 |
| 2020/0382466 A1* | 12/2020 | Ly | H04L 41/12 |

* cited by examiner

ACCESS TO AN OPERATOR PANEL OVER AN OUT-OF-BAND LOCAL NETWORK DOMAIN

BACKGROUND

The present disclosure relates to systems and methods for interfacing with one or more devices in a rack of computing equipment.

Background of the Related Art

In data center rack-server infrastructure, computing nodes or devices typically have had operator panels that facilitate initial configuration and basic identification, debug, and diagnostic information to operators that are positioned in front of the equipment. In a typical rack configuration, the result is a number of redundant operator panels, since a single operator panel could effectively be shared between co-located computing nodes.

One available solution to the problem of redundant operator panels is to place a common operator panel within the rack and either temporarily connect a cable from the operator panel to the computing node it will service at the time of service or permanently connect the operator panel to a switch that has connections to all computing nodes in the rack. However, both of these methods typically require a keyboard, mouse, and video connection between the operator panel and the connected computing node, which does not effectively proxy the function of an operator panel. Specifically, an operator panel can provide access to elements that may not be available on the video or serial console of a connected computing node.

Another solution is to include all of the necessary operator panel functions within the computing nodes themselves, such as within a plurality of servers, in order to provide all functionality at each computing node within the rack. However, this alternative is very costly.

A further solution is to eliminate the use of rack-local operator panels in favor of network-accessed equivalent functions on a portable computing node, such as a tablet, laptop computer, or smart phone, which data center personnel would carry with them. This solution eliminates the need for added functionality in the server or shared rack infrastructure with switching, but requires the data center personnel to carry one of the portable computing nodes and requires each computing node in the rack to have a network connection. However, this solution may represent a security concern in that the portable computing node may carry malicious code or may inadvertently facilitate sensitive data being carried out of the data center.

BRIEF SUMMARY

One embodiment provides an apparatus comprising at least one storage device for storing program instructions and a service processor for processing the program instructions to: send an out-of-band request for access to an operator panel, wherein the out-of-band request is sent over a local network domain operatively coupling a plurality of computing nodes; receive a first out-of-band reply identifying an address and one or more capabilities of an operator panel accessible over the local network domain; and negotiate an active link to the operator panel over the local network domain.

Another embodiment provides an apparatus comprising at least one storage device for storing program instructions, an operator panel, and a service processor operatively coupled to the at least one storage device and the operator panel, the service processor for processing the program instructions to: receive an out-of-band request for access to the operator panel, wherein the out-of-band request is received over a local network domain operatively coupling a plurality of computing nodes; send a first out-of-band message identifying an address and one or more capabilities of the operator panel; and negotiate an active link between the operator panel and a computing node over the local network domain.

DETAILED DESCRIPTION

Figure 1:
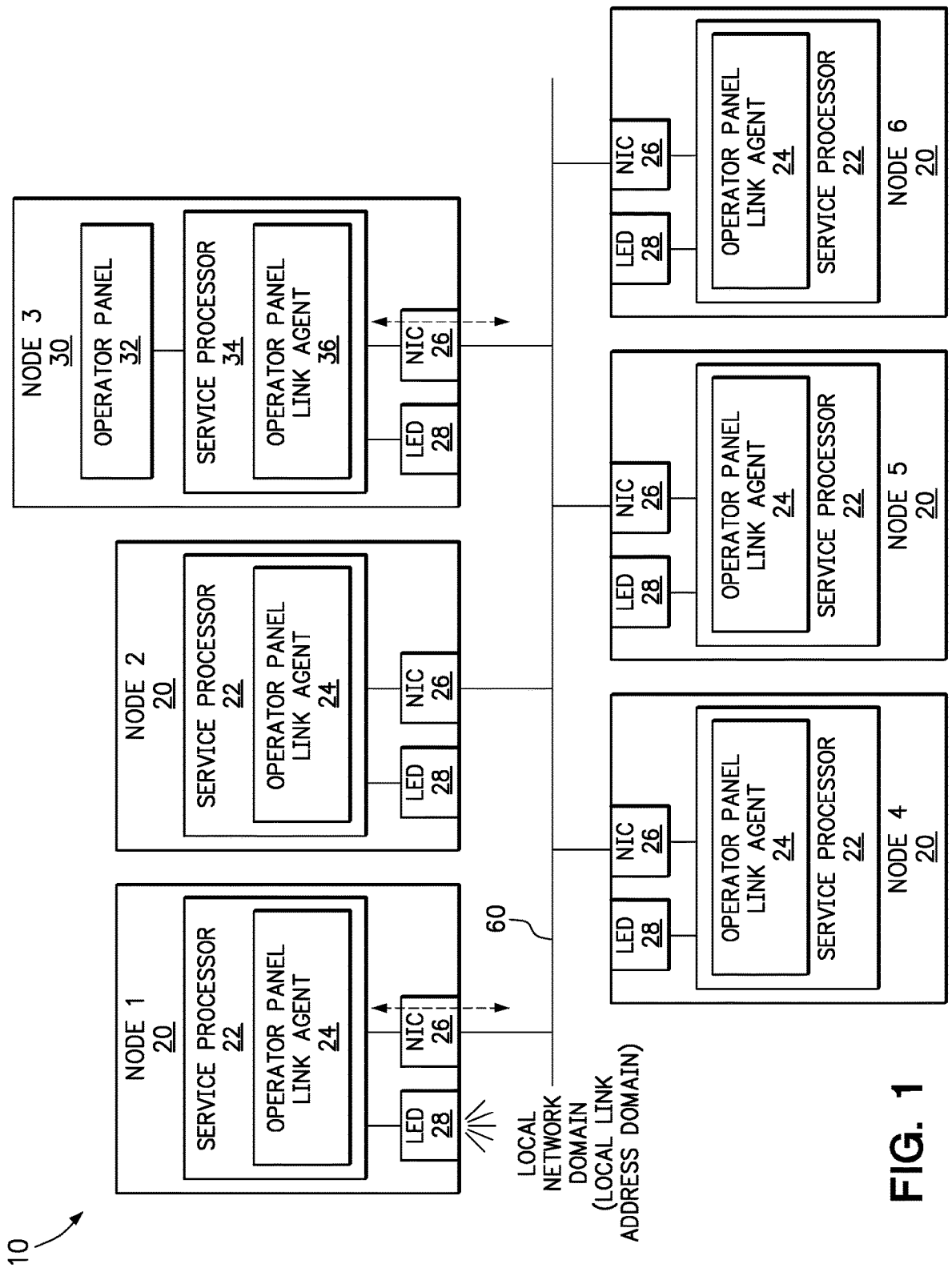
FIG. 1 is a diagram of a system including a plurality of computing nodes operatively coupled via a local network domain.

One embodiment provides an apparatus comprising at least one storage device for storing program instructions and a service processor for processing the program instructions to: send an out-of-band request for access to an operator panel, wherein the out-of-band request is sent over a local network domain operatively coupling a plurality of computing nodes; receive a first out-of-band reply identifying an address and one or more capabilities of an operator panel accessible over the local network domain; and negotiate an active link to the operator panel over the local network domain.

A service processor is an out-of-band processor or microcontroller that manages an interface between system management software and the hardware within a computing node. The service processor may, for example, be a baseboard management controller. A service processor may be included in a computing node, but the computing node will also include a central processing unit (CPU; or simply "processor") for processing an operating system and other applications or workloads. In certain embodiments, the service processor may be operatively coupled to a network interface controller for communications over an out-of-band local network domain within a rack or small number of co-located racks within the data center facility. The CPU may be operatively coupled to the same (or alternatively a different, dedicated) network interface controller for communications over a network, which may include logical separation of management processor and CPU traffic via implementation of one or more virtual local area network(s). The local network domain supports out-of-band communications between service processors in various computing nodes that are within the local network domain. Without limitation, the local network domain may be selected from an IPv6 Link-Local Address (LLA) domain and a single IPv4 network segment. Furthermore, the local network domain may be a virtual local area network, such that a network switch isolates the local network domain from other endpoints coupled to the network switch.

At least one of the computing nodes or devices in the local network domain should have a direct connection with an operator panel. For example, an operator panel may be integrated with, or otherwise directly connected to, at least one of the computing nodes. An operator panel may be controlled by the service processor that is part of a computing node to which the operator panel is directly connected.

Other computing nodes that have an active link to the computing node with the operator panel are able to connect with the operator panel over the out-of-band local network domain.

In one embodiment, the out-of-band request may be broadcast to the plurality of computing nodes that are operatively coupled to the local network domain. The service processor may further process the program instructions to receive a second out-of-band reply identifying an address and one or more capabilities of a second operator panel accessible over the local network domain, and select one of the first and second operator panels, wherein the active link is negotiated with the selected one of the first and second operator panels. In one option, the out-of-band request and the out-of-band reply are implemented using a service discovery protocol. One example of a service discovery protocol is Service Location Protocol (SLP)

In a further embodiment, the out-of-band request may be sent to a directory agent and the out-of-band reply may be received from the directory agent. The directory agent may reside on one of the computing nodes within the local network domain and may store a list of operator panels accessible over the local network domain. An operator panel may be added to the list when the directory agent receives an out-of-band message from a computing node that has an operator panel, where the out-of-band message announces the operator panel address and capabilities. Accordingly, any other computing node in the local network domain may discover or identify an available operator panel by sending the out-of-band request to the directory agent.

According to one embodiment of the apparatus, the service processor may further process the program instructions to receive and execute instructions from the operator panel over the active link. Without limitation, these instructions may be selected from a network configuration, service reset, service data display, alert status display, basic system information display, operational status, and combinations thereof. Accordingly, the service processor may execute the instructions to take actions on other components within the same computing node, or the service processor may report requested information, such as various operating parameters, back to the operator panel for display to a user. In one option, the service processor may further process the program instructions to illuminate a visual indicator in response to establishing an active link to the operator panel. Typically, such visual indicator may be located on an exterior surface of a computing node enclosure to assist a user in locating computing nodes that have an active link to the operator panel.

Another embodiment provides an apparatus comprising at least one storage device for storing program instructions, an operator panel, and a service processor operatively coupled to the at least one storage device and the operator panel, the service processor for processing the program instructions to: receive an out-of-band request for access to the operator panel, wherein the out-of-band request is received over a local network domain operatively coupling a plurality of computing nodes; send a first out-of-band message identifying an address and one or more capabilities of the operator panel; and negotiate an active link between the operator panel and a computing node over the local network domain. The operator panel that is operatively coupled to the service processor may be an external operator panel or may be integrated into a single housing with the service processor and a computing node.

The service processor that is operatively coupled to the operator panel may further process the program instructions to receive user-input through the operator panel, and send an instruction to the computing node (without an operator panel) over the active link in response to the user-input. The user-input may, without limitation, include selection of a function of the computing node having the active link with the operator panel, wherein the function is selected from the group consisting of a network configuration, service reset, service data display, alert status display, basic system information display, operational status, and combinations thereof.

Furthermore, the service processor that is operatively coupled to the operator panel may further process the program instructions to negotiate active links between the operator panel and a plurality of computing nodes over the local network domain, wherein the plurality of computing nodes do not have a dedicated operator panel. In one option, the service processor may receive user-input through the operator panel selecting the computing node from among the plurality of computing nodes in the local network domain that have an active link with the operator panel, and display a user-interface for the selected computing node on the operator panel in response to receiving the user-input. In another option, the service processor may receive a selection signal from one of the plurality of computing nodes, wherein the selection signal causes the operator panel to automatically select the computing node from among the plurality of computing nodes. The selection signal may be generated in response to user-actuation of a button physically positioned on an exterior of the computing node. The service processor may then display a user-interface for the computing node on the operator panel in response to receiving the selection signal indicating user-actuation of the button. In yet another option, the service processor may automatically select, from among the plurality of computing nodes, which computing node has the greatest need for user intervention, and then automatically display a user-interface for the selected computing node on the operator panel, wherein the user-interface displays operating parameters of the selected computing node.

A system of co-located computing nodes, such as a group of rack-mounted servers in a data center, may have a plurality of computing nodes that do not have their own operator panel and at least one computing node that does have its own operator panel. According to various embodiments herein, one or more of the plurality of computing nodes may establish an active link with the operator panel over an out-of-band local network domain. As a result, the operator panel may be used to interface with any of the computing nodes without the cost of each computing node having their own operator panel and without the risks associated with a portable operator panel.

FIG. 1 is a diagram of a system 10 including a plurality of computing nodes 20, 30 that may communicate over an out-of-band local network domain 60. The computing nodes 20, 30 are preferably co-located, such as in a rack located in a data center. The computing node 30 (Node 3) has an operator panel 32, whereas the other plurality of computing nodes 20 (Nodes 1-2 and 4-6) do not have an integrated or directly connected operator panel. Accordingly, each of the computing nodes 20 (without an operator panel) include a service processor 22 running an operator panel link agent 24, while the computing node 30 (which has an operator panel) includes a service processor 34 running an operator panel link agent 36. The service processors 22, 34, which may be baseboard management controllers (BMCs), may send and receive messages on the local network domain 60 using a network interface controller 26. Furthermore, each computing node 20, 30 may include one or more light emitting diodes (LEDs) 28 or other visual indicators on an exterior surface of a computing node enclosure, which may be used in accordance with one or more embodiments described herein.

The computing node 30 that is operatively coupled to the operator panel 32 may advertise the operator panel, including a network address for the operator panel and capabilities of the operator panel. Such advertising message may utilize a service discover protocol, such as a Service Locator Protocol (SLP). Preferably, the advertising of the operator panel only extends to the computing nodes that are within the local network domain 60, such as an IPv6 Link-Local Address (LLA) domain or a single IPv4 network segment.

One or more of the computing nodes 20 that does not have its own operator panel may send or broadcast a request on the local network domain 60 in search of a computing node with an operator panel. Typically, each of the computing nodes 20 will initially have a factory default configuration, which means that the computing nodes 20 may not be able to communicate on anything other than an IPv6 Link-Local Address. However, in specific network configurations, it is possible that an IPv4 default VLAN may be present that understands, and is interoperable with, default settings of the computing nodes.

Embodiments involve some manner of establishing an active link between the service processor of a computing node that does not have an operator panel and the service processor of a computing node that does have an operator panel. As a first example, the service processor for a computing node that does not have an operator panel may send an out-of-band request for access to an operator panel, wherein the out-of-band request is sent over a local network domain operatively coupling a plurality of computing nodes. Subsequently, the computing node that does not have an operator panel may receive a first out-of-band reply identifying an address and one or more capabilities of an operator panel accessible over the local network domain. Such a reply may come either from a computing node that does have an operator panel or from directory agent that stores information identifying one or more accessible operator panels. As a second example, the service processor for the computing node that has an operator panel may initially send (advertise) information identifying an address and one or more capabilities of an operator panel accessible over the local network domain, and the computing node that does not have an operator panel may subsequently send a request for access to an identified operator panel. It should be recognized that the embodiments are not limited to a specific order of the messages communicated between the computing nodes in order to negotiate an active link over the local network domain.

When the service processors of more than one computing node have established an active link with a particular computing node having an operator panel, there are various ways to select which computing node is being controlled through user-input to the operator panel. Accordingly, the operator panel is capable of acting as the "virtual operator panel" for the selected computing node.

A computing node may be selected in various ways, such as user selection through direct input to the operator panel or software selection responsive to relative need for attention. For example, if four computing nodes each have an active link with the service processor operatively coupled to the operator panel (i.e., the computing nodes are "sharing" the operator panel) and two of the four computing nodes need attention for service, the computing node experiencing the higher-priority event will be automatically selected for control of the operator panel and display its information on the operator panel awaiting local user attention. Alternatively, a button push on the endpoint computing node (such as a specialized "activate remote operator panel" button) may send a signal that selects that endpoint computing node to interface with the operator panel. Optionally, an LED on the selected computing node may be illuminated to indicate that the information on the operator panel corresponds with the selected computing node. Optionally, an operator may instruct the operator panel to illuminate an indicator LED on all supporting computing nodes that the operator panel is proxying for in order to facilitate operator selection.

The operator panel may support all available functions for each computing node that has established an active link with the operator panel. For example, the operator panel may support network configuration, service reset (including special power operations like reset to defaults), service data display, alert status display, basic system information display, and operational status.

Figure 2:
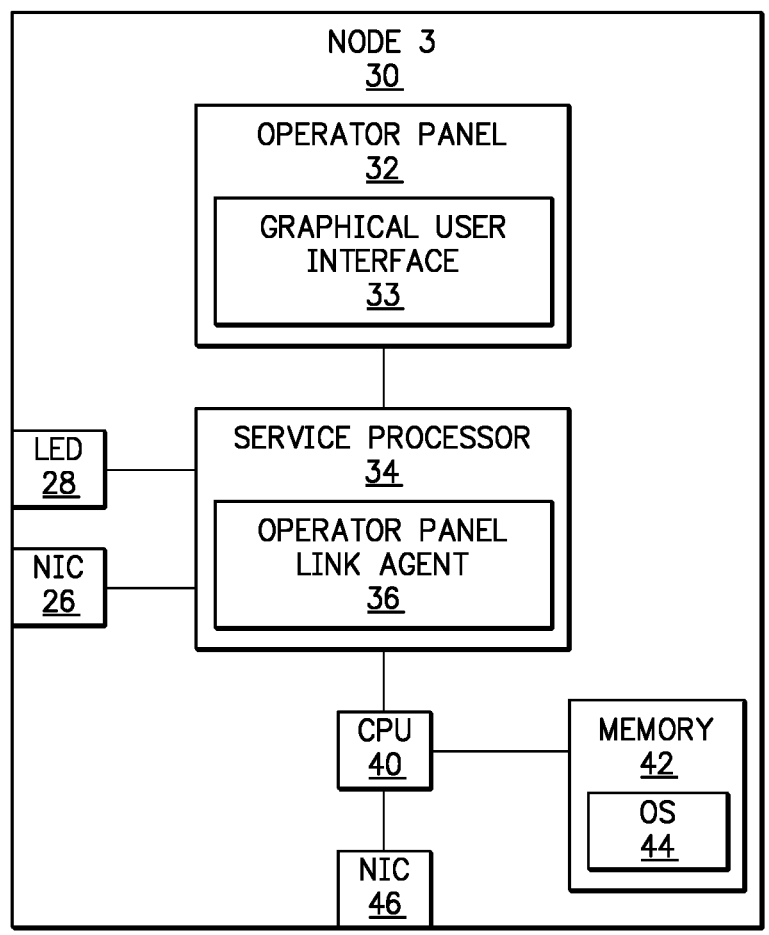
FIG. 2 is a diagram of a computing node having an operator panel.

FIG. 2 is a diagram of a computing node 30 having an operator panel 32. As shown in FIG. 1, the computing node 30 (Node 3) has an operator panel 32, which may have a graphical user interface 33 including a touchscreen. The operator panel 32 is operatively coupled to the service processor 34 for communication with the service processor. The operator panel link agent 36, which may be stored as software or firmware, is performed by the service processor 34 to interface with the operator panel 32, including both input to the panel and output from the panel. Furthermore, the operator panel link agent 36 is performed by the service processor 34 to send and receive communications over the out-of-band local network domain via the network interface controller (NIC) 26 and, optionally, to control illumination of the LED 28 according to one or more embodiments.

The computing node 30 further includes a CPU 40 that processes in-band tasks, such as execution of an operating system 44 that is stored in memory 42. Furthermore, the CPU 40 may communicate with other computing nodes and switches over a network using the network interface controller (NIC) 46. The CPU 40, memory 42, operating system 44 and (NIC) 46 are shown for completeness, but may not be involved in any specific aspect of the present embodiments. It should also be appreciated that although the plurality of computing nodes 20 (Nodes 1-2 and 4-6) in FIG. 1 do not have an integrated or directly connected operator panel, those computing nodes 20 may otherwise have similar architecture to the computing node 30.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computing node, comprising:
   a host central processing unit;
   at least one storage device for storing program instructions; and
   a service processor that is not the host central processing unit, the service processor configured to process the program instructions to:
   send an out-of-band request for access to an operator panel, wherein the out-of-band request is sent over a local network domain operatively coupling the service processor to service processors of a plurality of computing nodes, and wherein at least one of the computing nodes has a connected operator panel;
   receive a first out-of-band reply identifying an address and one or more capabilities of the connected operator panel accessible over the local network domain, wherein the first out-of-band reply is received from the service processor of the computing node having the connected operator panel; and
   negotiate an active link to the connected operator panel over the local network domain.

2. The apparatus of claim 1, the service processor configured to further process the program instructions to:
receive and execute instructions from the operator panel over the active link.

3. The apparatus of claim 1, wherein the out-of-band request is broadcast to the plurality of computing nodes that are operatively coupled to the local network domain.

4. The apparatus of claim 3, wherein the service processor sends the out-of-band request for access to an operator panel by broadcasting the out-of-band request to a plurality of service processors that are operatively coupled to the local network domain that includes the service processor, wherein each of the plurality of service processors is included in one of the plurality of computing nodes, wherein the first out-of-band reply is received from a second service processor of the plurality of service processors, wherein the first out-of-band reply identifies an address and one or more capabilities of a first operator panel that is connected to the second service processor and accessible to the first service processor through the second service processor over the local network domain, the service processor for further processing the program instructions to:
receive a second out-of-band reply from a third service processor of the plurality of service processors, wherein the second out-of-band reply identifies an address and one or more capabilities of a second operator panel accessible to the first service processor through the third service processor over the local network domain; and
select one of the first and second operator panels, wherein the active link is negotiated with the selected one of the first and second operator panels.

5. The apparatus of claim 1, wherein the local network domain is a virtual local area network.

6. The apparatus of claim 1, wherein the out-of-band request and the out-of-band reply are implemented using a service discovery protocol.

7. The apparatus of claim 1, wherein the operator panel is integrated with one of the plurality of computing nodes.

8. The apparatus of claim 1, the service processor configured to further process processing the program instructions to:
illuminate a visual indicator in response to establishing an active link to the operator panel.

9. A computing node, comprising:
a host central processing unit
at least one storage device for storing program instructions;
an operator panel; and
a first service processor operatively coupled to the at least one storage device and the operator panel, wherein the first service processor is not the host central processing unit, the first service processor configured to process the program instructions to:
receive an out-of-band request for access to the operator panel from a second service processor, wherein the out-of-band request is received over a local network domain operatively coupling a plurality of service processors of a plurality of computing nodes, the plurality of service processors including the first service processor and the second service processor, wherein each of the service processors are included in a separate computing node of the plurality of computing nodes;
send a first out-of-band reply identifying an address and one or more capabilities of the operator panel that is accessible over the local network domain, wherein the first out-of-band reply is sent to the second service processor over the local network domain; and
negotiate an active link between the operator panel and the second service processor over the local network domain.

10. The apparatus of claim 9, the first service processor configured to further process the program instructions to:
receive user-input through the operator panel; and
send an instruction to the second service processor over the active link in response to the user-input.

11. The apparatus of claim 10, wherein the user-input includes selection of a function of the computing node that includes the second service processor having the active link with the operator panel, wherein the function is selected from the group consisting of a network configuration, service reset, service data display, alert status display, basic system information display, operational status, and combinations thereof.

12. The apparatus of claim 9, the first service processor configured to further process the program instructions to:
negotiate active links between the operator panel and two or more of the service processors over the local network domain, wherein the two or more of the service processors are included in computing nodes that do not have a dedicated operator panel.

13. The apparatus of claim 12, the first service processor configured to further process the program instructions to:
receive user-input through the operator panel selecting the second service processor from among a plurality of service processors in the local network domain that have an active link with the operator panel through the first service processor; and
display a user-interface for the computing node that includes the second service processor on the operator panel in response to receiving the user-input.

14. The apparatus of claim 12, the first service processor configured to further process the program instructions to:
receive a selection signal from the computing node that includes the second service processor selecting the second service processor from among a plurality of service processors in the local network domain that have an active link with the operator panel through the first service processor, wherein the selection signal indicates user-actuation of a button physically positioned on an exterior of the computing node that includes the second service processor; and
display a user-interface for the computing node that includes the second service processor on the operator panel in response to receiving the selection signal indicating user-actuation of the button.

15. The apparatus of claim 9, the first service processor configured to further process the program instructions to:
automatically select, from among the plurality of service processors, which service processor is included in a computing node having the greatest need for user intervention; and
automatically display on the operator panel a user-interface for the computing node that includes the selected service processor, wherein the user-interface displays operating parameters of the computing node that includes the selected service processor.

16. The apparatus of claim 9, wherein the operator panel, the first service processor, and the at least one storage device are integrated into a single server housing.

17. The apparatus of claim 9, wherein the out-of-band request and the out-of-band reply are implemented using a service discovery protocol.

18. The apparatus of claim 1, wherein the service processor is a first service processor, wherein each of the computing nodes includes a second service processor operatively coupled to the first service processor over the local network domain, and wherein the first service processor receives the first out-of-band reply from one of the second service processors within the local network domain that is connected to the operator panel.

19. The apparatus of claim 18, wherein the address and the one or more capabilities of the operator panels are identified in the first out-of-band reply, and wherein the operator panel is accessible to the first service processor over the local network domain via the one of the second service processors that is connected to the operator panel.

\* \* \* \* \*